United States Patent
Vauchel

(10) Patent No.: US 9,206,765 B2
(45) Date of Patent: Dec. 8, 2015

(54) THRUST REVERSING DEVICE INCLUDING VARIABLE NOZZLE SECTION HAVING FIRST POSITION FOR VARIATION OF THE NOZZLE SECTION AND A SECOND POSITION FOR BLOCKING A COLD FLOW JET

(75) Inventor: Guy Bernard Vauchel, Harfleur (FR)

(73) Assignee: AIRCELLE, Gonfreville L'Orcher (FR)

(*) Notice: Subject to any disclaimer, the term of this patent is extended or adjusted under 35 U.S.C. 154(b) by 1012 days.

(21) Appl. No.: 13/321,831

(22) PCT Filed: May 18, 2010

(86) PCT No.: PCT/FR2010/050953
§ 371 (c)(1),
(2), (4) Date: Nov. 22, 2011

(87) PCT Pub. No.: WO2010/142881
PCT Pub. Date: Dec. 16, 2010

(65) Prior Publication Data
US 2012/0067975 A1 Mar. 22, 2012

(30) Foreign Application Priority Data
Jun. 10, 2009 (FR) .................................... 09 02807

(51) Int. Cl.
*F02K 1/72* (2006.01)
*F02K 1/76* (2006.01)

(52) U.S. Cl.
CPC . *F02K 1/72* (2013.01); *F02K 1/763* (2013.01); *F05D 2270/66* (2013.01); *Y10T 74/18576* (2015.01)

(58) Field of Classification Search
CPC .............. F02K 1/64; F02K 1/72; F02K 1/76; F02K 1/763; F02K 1/06; F05D 2270/66; Y10T 74/18576
USPC ........... 60/226.2, 226.3, 230, 771; 244/110 B
See application file for complete search history.

(56) References Cited

U.S. PATENT DOCUMENTS 3,302,889 A * 2/1967 Di Sabato ................ 239/265.29
3,601,992 A * 8/1971 Maison ........................ 60/226.2
(Continued)

FOREIGN PATENT DOCUMENTS

| EP | 0851111 A1 | 7/1998 |
| EP | 1128052 A1 | 8/2001 |

(Continued)

OTHER PUBLICATIONS

International Search Report issued Aug. 10, 2010 by European Patent Office re: PCT/FR2010/050953.

*Primary Examiner* — Phutthiwat Wongwian
*Assistant Examiner* — Carlos A Rivera
(74) *Attorney, Agent, or Firm* — Brinks Gilson & Lione

(57) ABSTRACT

The invention relates to a thrust reversing device (20) that includes at least one mobile cowling (30) mounted in translation in a direction substantially parallel to a longitudinal axis of a nacelle, capable of moving alternatively from a closing position on which it enables the aerodynamic continuity of the nacelle into an opening position in which it opens a passage in the nacelle for the bypassed flow, wherein said mobile cowling (30) also includes as an extension at least one variable nozzle section (40) including at least one panel (41) mounted so as to be capable of rotation, the panel (41) being adapted for pivoting towards at least one position entailing a variation in the nozzle section (40) on the one hand, and pivoting towards a position in which it blocks a cold flow jet (13) formed between a fixed structure of a turbojet fairing (12 and the nacelle on the other hand, wherein the mobile cowling (30) and the panel (41) are associated with actuation means (50) capable of activating the respective translation and rotation movements thereof, characterized in that said actuation means (50) are connected to an upstream end of the panel (41) by a driving connection rod (61) capable of moving about anchoring points respectively on the corresponding panel (41) and the associated actuation means (50).

13 Claims, 5 Drawing Sheets

(56) References Cited

U.S. PATENT DOCUMENTS 3,779,010 A * 12/1973 Chamay et al. ............. 60/226.2
5,267,438 A * 12/1993 Bunel et al. ................ 60/226.2
5,937,636 A * 8/1999 Gonidec et al. ............ 60/226.2
5,974,783 A * 11/1999 Gonidec et al. ............ 60/226.2
8,127,529 B2 * 3/2012 Pero et al. .................. 60/226.2

FOREIGN PATENT DOCUMENTS

| FR | 2887854 A1 | 1/2007 |
| FR | 2907512 A1 | 4/2008 |
| FR | 2917788 A1 | 12/2008 |
| FR | 2922058 A1 | 4/2009 |

* cited by examiner

THRUST REVERSING DEVICE INCLUDING VARIABLE NOZZLE SECTION HAVING FIRST POSITION FOR VARIATION OF THE NOZZLE SECTION AND A SECOND POSITION FOR BLOCKING A COLD FLOW JET

TECHNICAL FIELD

The present invention relates to a turbojet engine nacelle comprising a thrust reversing device and a variable nozzle section.

BRIEF DISCUSSION OF RELATED ART

A nacelle generally has a tubular structure comprising an air intake upstream of the turbojet engine, a middle section intended to surround a fan of the turbojet engine, a downstream section housing thrust reversing means and intended to surround the combustion chamber of the turbojet engine, and generally ends with a nozzle, the output of which is situated downstream of the turbojet engine.

Modern nacelles are intended to house a dual-flow turbojet engine able to generate, via the rotating blades of the fan, a flow of hot air (also called primary flow) coming from the combustion chamber of the turbojet engine, and a cold air flow (secondary flow) that circulates outside the turbojet engine through an annular passage, also called jet, formed between a fairing of the turbojet engine and an inner wall of the nacelle. The two air flows are ejected from the turbojet engine through the rear of the nacelle.

The role of a thrust reversing device is, during landing of an airplane, to improve the braking capacity thereof by reorienting at least part of the thrust generated by the turbojet engine forward. In that phase, the reverser obstructs the cold air flow and orients the latter toward the front of the nacelle, thereby generating a counter-thrust that is added to the braking of the airplane's wheels.

The implementing means to perform that reorientation of the cold flow vary depending on the type of reverser. However, in any case, the structure of a reverser comprises mobile elements that can be moved between, on the one hand, a deployed position in which they open, in the nacelle, a passage intended for the deflected flow, and on the other hand, a retracted position in which they close that passage.

These moving parts can perform a bypass function or simply an activation function of other bypass means.

Grid reversers are thus known in which the reorientation of the flow of air is done by cascade vanes, the moving part then consisting of a sliding cowling aiming to expose or cover said grids, the translation of said cowling occurring along a longitudinal axis substantially parallel to the axis of the nacelle.

Furthermore, aside from its thrust reversing function, the sliding cowling has a downstream side forming the jet nozzle aiming to channel the discharge of the air flows.

This jet nozzle comprises a series of mobile panels rotatably mounted at a downstream end of the sliding cowling.

These panels are adapted so as, on the one hand, to pivot toward a position causing a variation in the section of the nozzle and, on the other hand, to pivot toward a position in which, in the thrust reversing situation, they cover the jet in order to deflect the cold flow toward the cascade vanes exposed by the sliding of the mobile cowling.

The kinematics of actuating such a nozzle is complex.

In fact, the nozzle being mounted on the mobile cowling, the mobile panels must be associated with an actuating system making it possible, on the one hand, to drive them simultaneously and in a synchronized manner with the mobile cowling during the thrust reversal when the cowling moves to expose the cascade vanes and, on the other hand, to drive them when the cowling is in the retracted position to adapt the optimal section of the nozzle as a function of the different flight phases, i.e. the takeoff, cruising and landing phases of the aircraft.

Several dedicated actuating systems are known to respond to the particular desired kinematics of the panels of the variable nozzle and the mobile cowling.

However, they are not satisfactory.

The reliability of such systems is affected and maintenance difficulties are multiplied.

In fact, first, in order to ensure guiding of the panels from one position to another, the known actuating systems provide a linear actuator connected to the mobile cowling and the upstream end of one or more panels.

It has, however, been noted that the movements of each actuator during the rotational movements of the panels are not linear.

The actuator being subject to forces related to the pivoting of the panels by different angles and, in particular, the pivoting toward the outside of the jet, it may be affected by a bypass phenomenon that creates unwanted deviations in its travel relative to its straight path.

A first consequence of such a bypass is having actuator kinematics that produce lines of the nacelle during handling requiring a position differential relative to the mobile cowling not parallel to its movement.

Furthermore, these unwanted deviations can involve modifying the arrangement of the actuator relative to the cascade vanes.

The structure of the outer structure of the mobile cowling is also altered by the interruption in the continuity of aerodynamic lines due to the outward displacement of the actuator.

Moreover, in order to ensure pivoting of the panels from one position to the next, driving connection rods are also attached, on the one hand, to the panel, and on the other hand, to a fixed pint of the inner fairing structure of the turbojet engine delimiting the cold air jet.

However, the presence of these guide connection rods passing through the jet creates many aerodynamic disruptions in a zone with a high speed of movement of the cold air flow through the drag caused.

The anchor points of these connection rods on the inner structure of the fairing of the turbojet engine also have a drawback.

In fact, because the mobile structure of the device and the inner fairing structure of the turbojet engine are not independent of one another, the relative deformations experienced by the two structures can create unwanted deviations in the nozzle section during the different flight phases.

Furthermore, with such a dependency, maintenance operations become more complicated.

Moreover, in the existing thrust reversing devices, significant movements of the mobile cowling have been observed during the nozzle section variation phase, involving providing structure coverings between the mobile cowling and the fixed structure of the device and increasing the total deployment length of the actuators used.

These movements also involve a break in the continuity of the aerodynamic lines of the nacelle, in order to improve the retraction phase in the upstream direction of the mobile cowling during pivoting of the panels toward their position increasing the nozzle section.

Furthermore, the reliability of the sealing systems between the mobile cowling and the fixed structure of the thrust reversing device is affected by the multiplication of these movements.

BRIEF SUMMARY

One aim of the present invention is to offset the problems defined above.

Thus, one aim of the present invention is to propose a thrust reversing and nozzle section variation device having a simplified structure.

It is also important to offer a thrust reversing device in which the movements of the actuator during the handling phases of the mobile cowling and panels of the variable nozzle are controlled.

Another aim of the present invention is to propose a thrust reverser device limiting the movements of the mobile cowling during phases for varying the nozzle section.

It is also desirable to offer a thrust reversing device that reduces the aerodynamic losses in the jet and effectively ensures sealing between the jet and the nacelle outside.

Lastly, a final aim of the present invention is to propose a thrust reversing device in which the mobile structure of the device and the inner fairing structure of the turbojet engine are completely separated.

To that end, the invention proposes a thrust reversing device comprising at least one mobile cowling mounted in translation in a direction substantially parallel to a longitudinal axis of a nacelle, capable of moving alternatively from a closing position in which it enables the aerodynamic continuity of the nacelle into an opening position in which it opens a passage in the nacelle intended for the bypassed flow, said mobile cowling also including as an extension at least one variable nozzle section, said nozzle comprising at least one panel mounted so as to be capable of rotation, the panel being adapted for pivoting toward at least one position entailing a variation in the nozzle section on the one hand, and pivoting towards a position in which it blocks a cold flow jet formed between a fixed structure of a turbojet fairing and the nacelle on the other hand, the mobile cowling and the panel being associated with actuation means capable of activating the respective translation and rotation movements thereof, remarkable in that said actuation means are connected to an upstream end of the panel by a driving connection rod capable of moving about anchoring points 63 respectively on the corresponding panel and the associated actuation means.

Thanks to the present invention, the movements of the actuating means remain rectilinear in a direction substantially parallel to the longitudinal axis of the nacelle irrespective of the handling phases of the mobile cowling and the panels of the variable nozzle.

Advantageously, the driving connection rods passing through the cold flow jet of the nacelle are also eliminated.

According to specific embodiments, the thrust reversing device can comprise one or more of the following features, considered alone or according to all technically possible combinations:
- two driving connection rods surround the actuating means of the panel;
- the driving connection rod(s) have a bent shape;
- the driving connection rod(s) are associated with a fairing so that the aerodynamic continuity of the outer lines of the nacelle is ensured;
- the actuating means comprise a linear actuator made up of three concentric bodies, i.e. a central body, an outer body and an inner body, all three forming shafts, the central body having a first, outer thread able to cooperate with a corresponding thread of the outer body and a second, inner thread able to cooperate with a corresponding thread of the inner body, one of the bodies being blocked in translation and able to be connected to adapted rotational driving means while the other two bodies, each intended to be connected to the cowling and the panel to be driven, are free in translation and blocked in rotation;
- the body connected to the rotational means is the central body, the inner body is intended to be connected to the mobile cowling while the outer body is intended to be connected to the connection rod for pivoting the panel;
- the outer thread of the central body has a pitch larger than the pitch of the inner thread;
- the actuating means comprise two distinct linear actuators respectively associated with the cowling and the panel to be driven, each of the actuators comprising a shaft able to allow, respectively, the panel to pivot toward a position where it obstructs the cold flow jet and toward a position varying the section of the nozzle as well as the translational movement of the cowling;
- the actuating means are associated with control means able to perform a controlled differential movement of the panel and the cowling to be driven;
- the panel is mounted rotationally mobile around a pivot along an axis perpendicular to the longitudinal axis of the nacelle;
- the thrust reversing device also comprises upstream sealing means between the cold flow jet and the outside of the nacelle arranged under bypass means;
- the thrust reversing device also comprises downstream sealing means between an inner structure of the cowling and the panel;
- the panel is extended by a fixed downstream shroud.

The invention also proposes a dual-flow turbojet engine nacelle comprising a downstream section equipped with a thrust reversing device as mentioned above.

BRIEF DESCRIPTION OF THE DRAWINGS

Other aspects, aims and advantages of the invention will appear upon reading the following detailed description of preferred embodiments thereof, provided as a non-limiting example and done in reference to the appended drawings, in which.

DETAILED DESCRIPTION

A nacelle is intended to form a tubular housing for a dual flow turbojet engine and serves to channel the flows of air it generates via blades of a fan, i.e. a hot air flow passing through a combustion chamber and a cold air flow circulating through the outside of the turbojet engine.

The nacelle generally has a structure comprising an upstream section forming an air intake, a middle section surrounding the fan of the turbojet engine, and a downstream section surrounding the turbojet engine.

Figure 1:
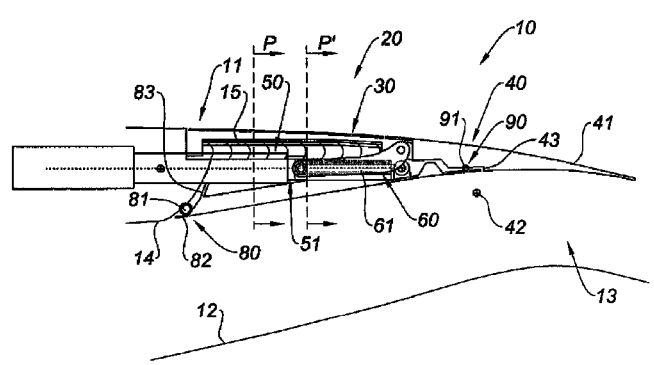
FIG. 1 is a diagrammatic longitudinal cross-sectional view of a thrust reversing device according to a first embodiment of the present invention in a direct thrust position.

FIG. 1 shows part of this downstream section, designated by general reference 10.

This downstream section 10 comprises an outer structure 11 including a thrust reversing device 20 and an inner engine fairing structure 12 defining, with the outer structure 11, a jet 13 intended for the circulation of a cold flow in the case of the dual-flow turbojet engine nacelle as presented here.

The downstream section 10 also comprises a forward frame 14, a mobile cowling 30, and a jet nozzle section 40.

The mobile cowling 30 is intended to be actuated in a substantially longitudinal direction of the nacelle between a closing position, in which it comes into contact with the forward frame 14 and ensures the aerodynamic continuity of the outer lines of the downstream section 10, and an opening position, in which it is spaced apart from the forward frame 14, then opening a passage in the nacelle by exposing air flow cascade vanes 15.

The movement of the mobile cowling 30 is done by a rail/slide system known by those skilled in the art.

Furthermore, the jet nozzle section 40 in the extension of the mobile cowling 30 comprises a series of mobile panels 41 rotationally mounted at a downstream end of the mobile cowling 30 and distributed on the periphery of its jet nozzle section 40.

Each panel 41 is adapted on the one hand to pivot toward a position driving a variation of the nozzle section 40 and, on the other hand, to pivot toward a position in which it obstructs the cold flow jet 13 and returns that air toward the cascade vanes 15 that reorient the flow, thereby allowing the thrust reversal.

Each panel 41 is supported by the mobile cowling 30 via pivot points 42 along an axis perpendicular to the longitudinal axis of the nacelle with the inner portion of the mobile cowling 30 and with said mobile panel 41.

According to the invention, the transition from one position of a mobile panel 41 to another is controlled by actuating means 50 connected to the panel 41 via a driving system 60 formed by at least one driving connection rod 61 downstream of their structure.

The actuating means 50 can activate the movement of the mobile cowling 30 as well as the pivoting of the panel 41 toward a position causing the section of the nozzle 40 to vary and toward a position where it obstructs the cold flow jet 13.

They comprise at least one electric, hydraulic or pneumatic linear actuator.

Figure 9:
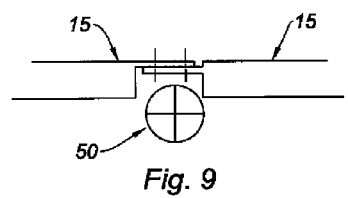
FIG. 9 is a cross-sectional view of cascade vanes of the thrust reversing device of FIG. 1 along the plane P' visible in FIG. 1.

As illustrated in FIG. 9, the actuator can be placed between two fastening lines of the cascade vanes 15.

One alternative embodiment can propose an actuator detached from the cascade vanes 15 and that can be oriented in any desired angular position.

Figure 2A:
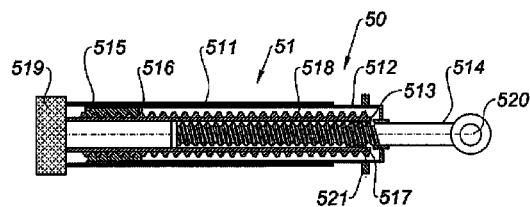
FIGS. 2a and 2b are longitudinal cross-sectional illustrations of an actuator of the thrust reversing device of FIG. 1, respectively in the retracted position and the deployed position.
Figure 2B:
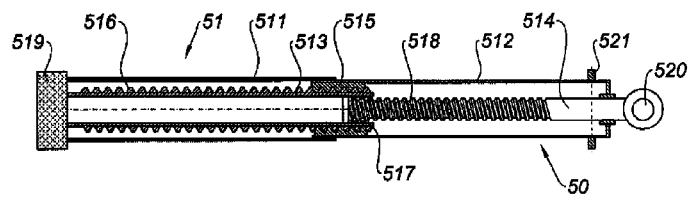

In one embodiment of the present invention illustrated in FIGS. 2a and 2b, the actuator 51 is a dual-action actuator with a programmed effect.

Dual action actuator with programmed effect refers to an actuator that can drive the mobile cowling 30 and the panel 41 of the nozzle 40 relative to the fixed forward frame 14 at different speeds, but with a same power drive.

More specifically, in reference to FIGS. 2a and 2b, one such actuator 51 comprises a cylindrical base 511 inside which three concentric tubular bodies forming shafts, i.e. an outer body 512, a central body 513, and an inner body 514, are housed.

The base 511 is intended to be attached to the forward frame 14, typically via a gimbal joint or ball joint known by those skilled in the art.

Each of the three tubular bodies 512, 513, 514 is mechanically engaged with the adjacent body via an outer and/or inner thread.

More specifically, in the embodiment illustrated in FIGS. 2a and 2b, the outer body 512 has an inner thread 515 engaged with a corresponding outer thread 516 supported by the central body 513, the latter also having an inner thread 517 engaged with a corresponding outer thread 518 supported by the inner body 514.

Furthermore, the central body 513 is blocked in translation and mounted in rotation on rotational driving means 519 housed in the base 511 of the actuator 51. The outer body 512 and inner body 514 are blocked in rotation and left translationally mobile, as shown in FIG. 2b.

In fact, the inner body 514 can allow the mobile cowling 30 to move. To that end, the inner body 514 comprises, at its downstream end, a fastening eyelet 520 intended to be fixed to the inner part of the mobile cowling 30.

The outer body 512 can allow a panel 41 of the nozzle 40 to pivot.

It is thus connected by its downstream end to the upstream end of the panel 41 via at least one aforementioned driving connection rod 61 articulated on a transverse drive shaft 521 provided, to that end, on its structure.

Thus, the movement of the outer body 514 in the upstream direction or in the downstream direction of the nacelle is accompanied by the pivoting of the driving connection rod 61 and, as a result, the panel 41.

Concerning the driving system 60 by connection rods, the length as well as the driving points of the connection rod 61 on the upstream end of the mobile panel 41 are adapted to allow the cold flow jet 13 to be effectively covered by the panel 41 in reverse thrust.

Preferably, the driving points of the connection rod 61 on the upstream end of the panel 41 must be placed as far upstream as possible to produce the greatest possible lever arm with the pivot 42 of the panel 41, as will be described later.

This upstream position is limited by the presence of cascade vanes 15.

Furthermore, a first embodiment provides a series of two driving connection rods 61 surrounding the outer body 512 of the actuator 51, i.e. connection rods articulated around a transverse axis on either side of the outer body 512 of the actuator 51.

In a second embodiment, a single driving connection rod 61 per panel 41 is necessary. To that end, in one non-limiting example, the driving point of the connection rod 61 on the actuator 51 can be provided on the outer body 512 fastened in a yoke toward the outside of the nacelle.

Furthermore, in another alternative embodiment, it is possible to providing driving connection rods 61 configured so as to improve the kinematics and play between the pivoting panels and the downstream of the grids 15.

Thus, in one non-limiting example illustrated in FIG. 1, each driving connection rod 61 can have a bent shape, in order to reduce or even cancel out the need to create a passage downstream of the cascade vanes 15 for the displacement of the connection rod 61.

This offer also has the advantage of not interrupting the structure of the cascade vanes 15.

Owing to such a driving system, the actuator 51 maintains its straight trajectory along the longitudinal axis of the nacelle during its extension and retraction to move the mobile cowling 30 and the panel 41 of the nozzle 40.

During the increase of the nozzle section 40 in particular, the axis passing through the two driving points of the connection rod 61 forms a lever arm with the pivot 42 of the panel 41, in order to guarantee an effort in the actuator 51 admissible in this phase of varying the nozzle section 40 allowing it not to undergo any bypass in its movements while preserving a rectilinear movement of said actuator.

Furthermore, advantageously, such a driving system offers great reliability because the number of driving elements present in the cold flow jet 13 is decreased relative to the thrust reversal devices of the prior art.

In fact, one does away with arranging driving connection rods 61 through the jet 13 to fix them on the inner fairing structure 12 of the engine to cover the jet 13 so as to optimize the reversal of the cold flow.

The mobile structure 11 of the downstream section 10 also becomes independent of the inner fairing structure 12 of the engine, which facilitates the maintenance operations of the nacelle.

Moreover, by providing a dual-action actuator with a programmed effect, the mobile cowling 30 and the mobile panels 41 are actuated with kinematics specific to them during adjustment of the nozzle section variation 40 or during the thrust reversal.

In fact, due to the different thread pitch between the different bodies 512, 513, 514 of the actuator 51 and a same power drive, one automatically adapts the travel and movement speeds of the mobile cowling 30 and the mobile panel 41 between them and relative to the forward frame 15.

This offers the advantage of being able to limit the movements of the mobile cowling 30 to very small or no movements during the pivot phases of the mobile panel 41 in a position making it possible to increase or reduce the section of the jet nozzle 40.

The operation of the thrust reversal device 20 is the following.

When the rotational driving means 519 rotate the central body 513, it transmits that movement to the outer 512 and inner 514 body of the outer 515, 516 and inner 517, 518 respective threads.

The outer 512 and inner 514 bodies being blocked in rotation, the driving movement of the central body 513 is transformed into translational movement of the outer 512 and inner 514 bodies.

The direction and linear speed of translation of each body respectively depend on the direction of rotation of the driving means 519 and the orientation and pitch of each thread.

In one embodiment of the present invention, the pitch of the outer threads 515, 516 is greater than the pitch of the inner threads 517, 518. It follows that the outer body 512 will move in translation at a speed faster than that of the inner body 514 and consequently, the panel 41 will move faster than the mobile cowling 30.

The translational movement of the outer body 512 is accompanied by pivoting of the driving connection rod(s) 61 and, consequently, the pivoting of the panel 41.

Figure 3:
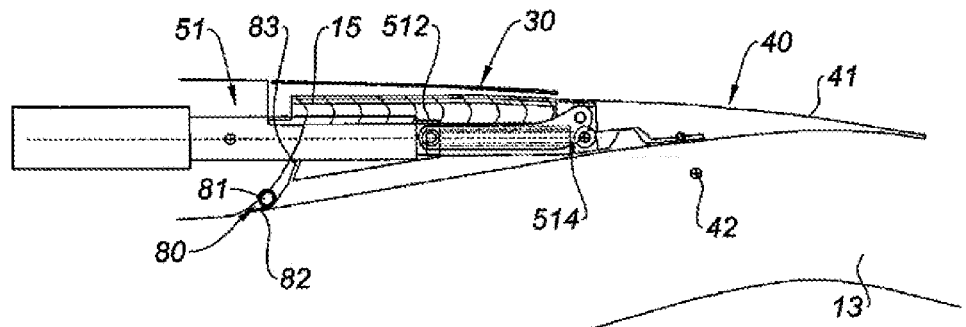
FIGS. 3 to 5 are diagrammatic illustrations in longitudinal cross-section of the thrust reversing device of FIG. 1 having mobile panels respectively in an open nozzle position, a closed nozzle position and a reverse thrust position.
Figure 4:
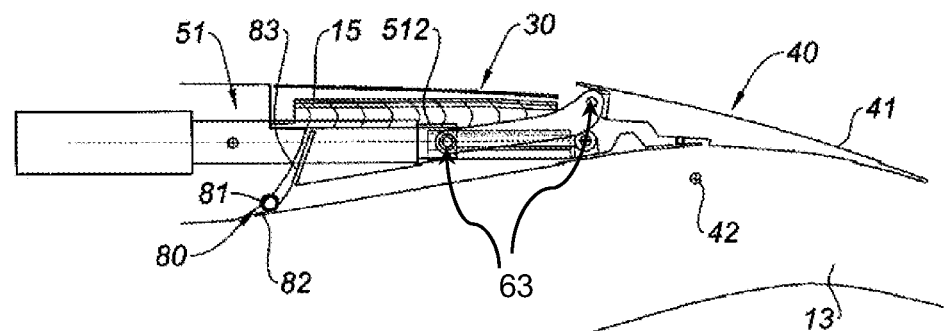
Figure 5:
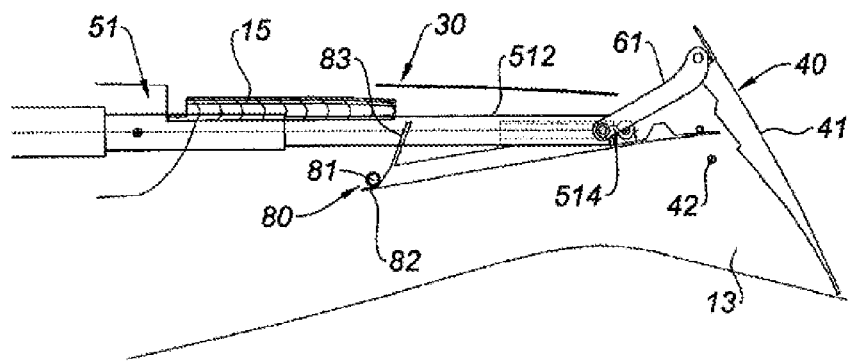

FIGS. 3 to 5 show different positions of the mobile panel 41 as a function of the deployment of the linear actuator with a programmed effect and the degree of movement of the cowling 30.

In FIG. 3, the mobile cowling 30 is in a closing position covering the cascade vanes 15.

It has not been moved, the inner body 514 of the actuator 51 having remained practically stationary.

The outer body 512 of the actuator 51 has been actuated and retracted in the upstream direction of the nacelle, then driving the pivoting of the mobile panel 41 from its pivot 42 toward the outside of the jet 13, thereby increasing the section of the nozzle 40.

In FIG. 4, the outer body 512 of the actuator 51 has been actuated and extended in the downstream direction of the nacelle, then driving the pivoting of the mobile panel 41 around its pivot 42 toward the inside of the jet 13, thereby decreasing the section of the nozzle 40.

During these two phases for adjusting the section of the jet nozzle 40, the mobile cowling 30 has modified its position closing the cascade vanes 15 little or not at all.

Furthermore, sealing means upstream and downstream of the mobile cowling 30, which will be described later, have remained active.

More specifically, as illustrated in FIGS. 3 and 4, the upstream sealing 80 is not affected by the movement of the panel 41 and the play necessary for the relative movements of the mobile cowling 30 relative to the forward frame 15 are not deteriorated.

In FIG. 5, the inner body 514 of the actuator 51 is deployed maximally. The mobile cowling 30 is thus moved in the downstream direction of the nacelle by a length substantially equal to the length of the cascade vanes 15 to be fully open.

At the same time, the outer body 512 is actuated in the downstream direction, pivoting the panels 41 around its pivot inside the jet 13 so that they fully play their role as thrust reverser covering the jet 13 to force the air to be oriented through cascade vanes 15.

As illustrated in FIG. 5, due to the selected thread pitches, the outer body 512 moves faster than the inner body 514 and the two driving points of the connection rod 61 and the mobile cowling 30, respectively, on the actuator 51 tend to come together.

Advantageously, the translational movement of the mobile cowling 30 and the rotational movement of the panel 41 of the nozzle 40 are automatically synchronized to perform the thrust reversal.

It should be noted that the embodiment described in reference to FIGS. 1 to 5 is not limiting.

Thus, an alternative embodiment can provide for connecting the three tubular bodies of the actuator 51 together to the rotational driving means 519 and the two mobile parts, i.e. the cowling 30 and the panel 41 of the nozzle 40. Thus, in another non-limiting example, the outer body 512 of the actuator can be adapted to move the mobile cowling 30, while the inner body 514 can be adapted to move the panel 41 of the nozzle 40.

Figure 6:
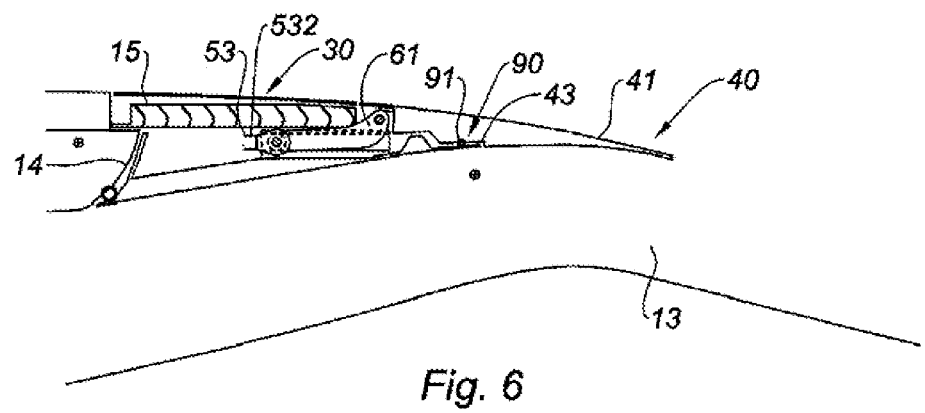
FIG. 6 is a diagrammatic illustration in longitudinal cross-section of a thrust reversing device according to a second embodiment of the present invention in a direct thrust position.
Figure 7:
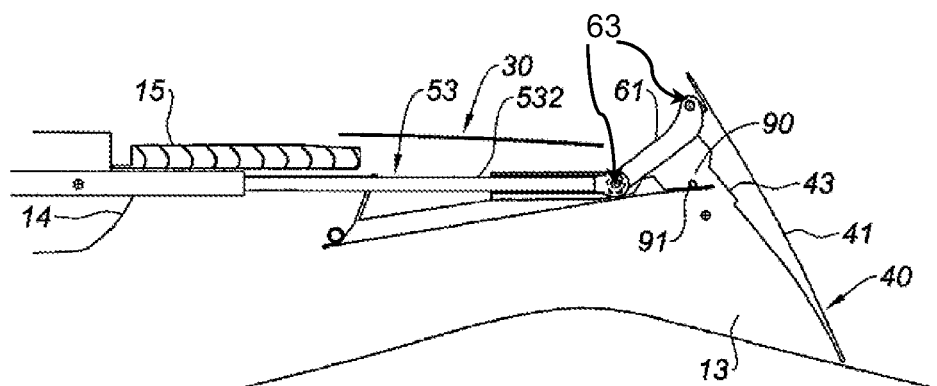
FIG. 7 is a diagrammatic illustration in longitudinal cross-section of the thrust reversing device of FIG. 6 in a reverse thrust position.
Figure 8:
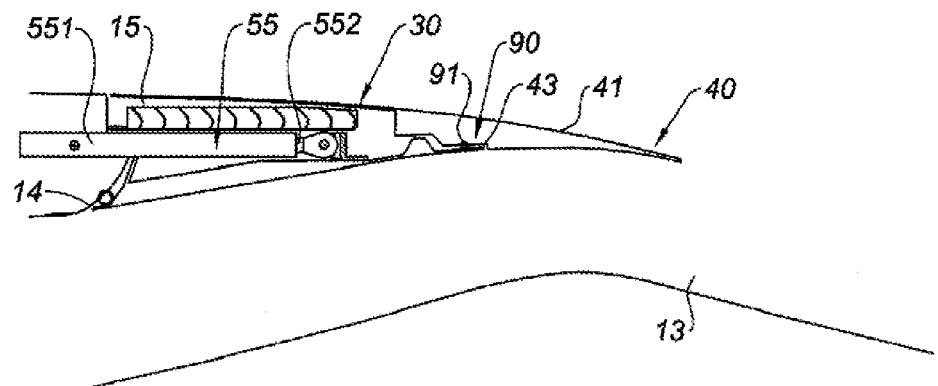
FIG. 8 is a diagrammatic illustration in longitudinal cross-section of the thrust reversing device of FIG. 6 showing means for actuating a mobile cowling of said device.

In a second embodiment of the present invention illustrated in FIGS. 6 to 8, the actuating means 50 comprise two independent linear actuators 53, 55 respectively dedicated to pivoting the mobile panels 41 of the nozzle 40 and moving the mobile cowling 30.

These actuators 53, 55 are associated with control means (not visible) adapted to activate the pivoting of each panel 41, independently of one another, toward a position driving the variation of the nozzle section 40 or toward a position where it obstructs the cold flow jet 13 and the movement of the mobile cowling 30.

These control means can thus perform a controlled differential movement of the cowling 30 and the panel 41.

This offers the advantage of being able to keep the mobile cowling 30 fixed, i.e. in its position closing the cascade grids 15 in direct thrust during the adjustment of the nozzle section 40 by the mobile panels 41.

More specifically, in reference to FIGS. 6 and 7, a first actuator 53 dedicated to the rotational movement of the panels 41 comprises a cylindrical base 531 inside which a shaft 532 is housed.

The base 531 is intended to be attached to the forward frame 14, while the shaft 532 is connected, at its downstream end, to the upstream end of the panel 41 via at least one driving connection rod 61 articulated on a transverse drive shaft provided on its structure.

This driving connection rod 61 enables the pivoting of the corresponding panel 41 during a movement of the shaft 532 in the upstream or downstream direction of the nacelle.

This embodiment thus offers the same advantages as the first embodiment described in reference to FIGS. 1 to 5.

In reference to FIG. 8, the inner portion of the mobile cowling 30 is connected to the at least one end of a second actuator 55 that can allow the mobile cowling 30 to move upstream or downstream of the nacelle.

The downstream end of the shaft 552 of the actuator 55 is connected to the inner structure of the cowling 30 while the base 551 of the actuator 55 is fixed, at its upstream end, to the forward frame 14.

FIGS. 6 and 7 illustrate different positions of the mobile panels 41.

In FIG. 6, the mobile cowling 30 is in the closing position covering the cascade vanes 15.

Furthermore, the shaft 532 of the first actuator 53 not being extended, the cowling 30 has a usual nozzle section.

In FIG. 7, the control means for two actuators 53, 55 are adapted to automatically move, along different travels, the cowling 30 and the panel 41 during the thrust reversal.

Thus, the shaft 532 of the first actuator 53 has been extended to an adapted length in the downstream direction of the nacelle, driving the pivoting of the panels 41 via the driving connection rod 61 toward the inside of the jet 13 in order to fully play their role as thrust reversers covering the jet 13.

The shaft 552 of the second actuator 55 has also been extended to an adapted length in order to drive the cowling 30 in the downstream direction of the nacelle exposing the cascade vanes 15.

Furthermore, during adjustment of the nozzle section 40, the control means are adapted to drive the pivoting of the panels 41 toward the inside or outside of the jet 13, the cowling 30 remaining fixed thereto.

In reference to FIGS. 1 and 3 to 5, the thrust reversing device also comprises upstream sealing means 80 between the cold flow jet 13 and the outside of the nacelle arranged under the cascade vanes 15.

These upstream sealing means 80 are preferably supported by the cowling 30.

They comprise a pressure seal 81 preferably supported by an upstream extension 82 of the inner portion of the mobile cowling 30 in contact with the forward frame 14.

This makes it possible to ensure sealing contact between the fixed structure of the device 20 and the mobile cowling 30 in the direct thrust phases, i.e. during variation of the nozzle section 40.

The upstream sealing means 80 also comprise an upstream apron 83 intended to make the downstream of the cascade vanes 15 partially or completely sealed.

Said apron 83 extends, upstream of the inner portion of the mobile cowling 30, toward the cascade vanes 15 as far as the vicinity thereof.

It can be intended to serve as a shield for the cold flow forcing it to move toward the cascade vanes 15 during the thrust reversal.

Furthermore, the thrust reversal device 20 comprises downstream sealing means 90 between the cold flow jet 13 and the outside of the nacelle arranged under the panels 41 of the nozzle 40.

These downstream sealing means 90 comprise a pressure seal 91 supported by the downstream end of the inner structure of the mobile cowling 30 in contact with a diversion 43 on the inner surface of the mobile panel 41 in order to ensure relative sealing at the interface between the cowling 30 and the panels 41.

In one alternative embodiment, the downstream sealing means 90 can be supported by the mobile panel itself 41.

Figure 10:
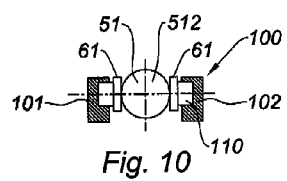
FIG. 10 is a cross-sectional view of a system for sliding an actuator of the thrust reversing device of FIG. 1 along the plane P visible in FIG. 1.

Moreover, FIG. 10 shows an alternative embodiment of the present invention in which the thrust reversal device 20 also comprises means 100 for guiding the linear actuator 51.

These guide means 100 are intended to combat buckling in the structure of the actuator 51 due to the presence of connection rods supplying forces not working with the main axis of the actuator 51.

More specifically, the outer body 512 of the actuator 51 is mounted mobile in two lateral slide channels 101, 102 for translational guiding arranged in the structure of the mobile cowling 30.

These slide channels 101, 102 are adapted to cover the entire travel length of the outer body 512 of the actuator 51.

Each of these is provided with a roller 110 and is intended to receive the transverse drive shaft of the two driving connection rods 61 that surrounds that outer body 512.

With such guiding, the outer body 512 of the actuator 51 does not undergo any parasitic force coming from the connection rods 61 and the risk of buckling is eliminated.

Furthermore, in this alternative embodiment, it is necessary not to create hyperstatic assembly points aligned between the two driving points of the mobile cowling 30 and the panel 41.

Radial play is therefore defined for driving of the mobile cowling by the inner body of the actuator.

In one non-limiting example, the inner body 514 of the actuator 51 is connected to the mobile cowling 30 by a transverse drive shaft placed in an oblong cavity extending in a direction perpendicular to the direction of travel of the cowling 30.

Another example includes either the placement of an elastic interface between the two elements, or the addition of a driving connection rod connected on either side of the mobile cowling 30 and the inner body 514 and oriented in the direction of the main axis of the actuator 51.

Figure 11:
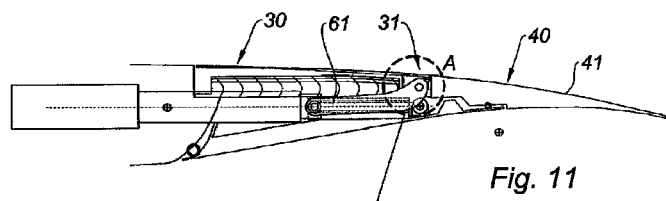
FIG. 11 is a diagrammatic view in longitudinal cross-section of a thrust reversing device according to a third embodiment of the present invention in a direct thrust position.
Figure 12:
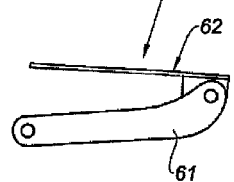
FIG. 12 is an enlarged view of zone A of the thrust reversing device of FIG. 11.

In reference to FIGS. 11 and 12, a third embodiment of the present invention proposes associating the driving connection rod(s) 61 of the panels 41 with a fairing 62.

This offers the advantage of reducing aerodynamic continuity defects of the outer lines of the nacelle at the fastening of the driving connection rods 61.

This fairing has a profile in the shape of a P rotated by 90°.

Preferably, it is mounted rigidly by the head of the P on the driving connection rod 61.

Furthermore, it is placed between the mobile cowling 30 and the panel 41 of the nozzle 40 downstream.

The bar of the P is mounted in a cutout 31 formed on the outer structure of the mobile cowling 30, in order to ensure the aerodynamic continuity between the outer structure of the mobile cowling 30 and the panel 41 downstream.

Figure 13:
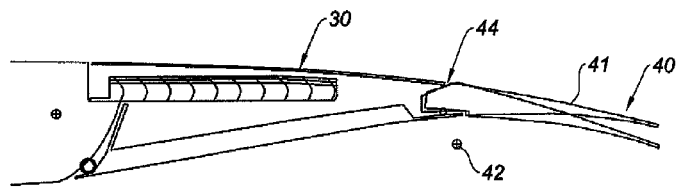
FIG. 13 is a diagrammatic illustration in longitudinal cross-section of a thrust reversing device according to a fourth embodiment of the present invention.

In FIG. 13, a fourth embodiment of the present invention is shown in which a particular diversion 44 is provided for the upstream end of the mobile panels 41 of the nozzle.

This diversion 44 is intended to enable the continuity of the outer aerodynamic lines of the nacelle during adjustment of the nozzle section 40 and, more specifically, during the section reduction thereof.

Thus, the upstream end of the panel 41 adjacent to the outer structure of the mobile cowling 30 assumes a recess shape that can be beveled 44, which allows the panel 41 not to overhang the outer aerodynamic lines of the nacelle when it pivots around its hinge pin 42.

The impact of the rotation of the panel 41 on the aerodynamic continuity of the outer lines of the nacelle is minimized.

Figure 14:
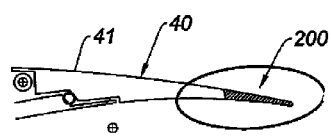
FIGS. 14 to 16 are diagrammatic illustrations in longitudinal cross-section of a mobile panel of a thrust reversing device according to a fifth embodiment, in the direct thrust, variable nozzle and reverse thrust positions, respectively.
Figure 15:
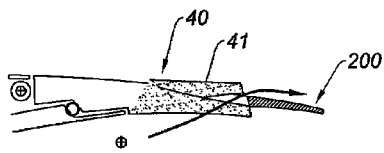
Figure 16:
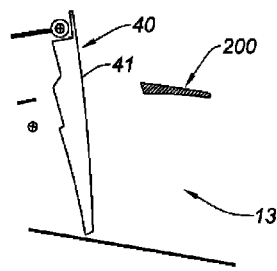

Furthermore, in a fifth embodiment of the present invention illustrated in FIGS. 14 to 16, a fixed downstream shroud 200 is formed at the downstream end of the mobile panels 41 of the nozzle 40.

This offers the advantage of keeping an adjusted direct jet nozzle section in which the section machining deviations are minimized.

Thus, as illustrated respectively in FIGS. 15 to 16, the shroud 200 remains fixed during the change of position of the mobile panels 41 in the position reducing or increasing the nozzle section 40 and when they pivot to cover the cold flow jet 13 reversing the thrust.

An alternative embodiment provides a shroud 200 adapted to support, at its downstream end, a complementary surface of the chevron type.

Of course, the invention is not limited solely to the embodiments of the thrust reversing device described above as examples, but on the contrary encompasses all possible alternatives.

Thus, the present invention can be applied to a thrust reversing device not comprising cold flow cascade vanes.

The invention claimed is:

1. A thrust reversing device comprising:
    at least one mobile cowling mounted in translation in a direction substantially parallel to a longitudinal axis of a nacelle, capable of moving alternatively from a closing position in which the at least one mobile cowling enables an aerodynamic continuity of the nacelle into an opening position in which the at least one mobile cowling is substantially parallel to the longitudinal axis of the nacelle and opens a passage in the nacelle intended for bypassed flow,
    the at least one mobile cowling also including as an extension at least one variable nozzle section, comprising at least one panel mounted so as to be capable of rotation, the at least one panel being adapted for pivoting toward a first position entailing a variation in the at least one variable nozzle section, and pivoting towards a second position in which the at least one panel blocks a cold flow jet formed between a fixed structure of a turbojet fairing and the nacelle,
    the at least one mobile cowling and the at least one panel being associated with actuation means capable of activating respective translation and rotation movements thereof,
    wherein said actuation means are connected to an upstream end of the at least one panel by a driving connection rod capable of moving about anchoring points respectively on the corresponding panel and the associated actuation means.

2. The thrust reversing device according to claim 1, wherein two driving connection rods surround the actuating means of the at least one panel.

3. The thrust reversing device according to claim 2, wherein the driving connection rod(s) have a bent shape.

4. The thrust reversing device according to claim 2, wherein the driving connection rod(s) are associated with a fairing so that an aerodynamic continuity of outer lines of the nacelle is ensured.

5. The thrust reversing device according to claim 1, wherein the actuating means comprise a linear actuator made up of three concentric bodies, comprising a central body, an outer body and an inner body, all three forming shafts, the central body having a first, outer thread able to cooperate with a corresponding thread of the outer body and a second, inner thread able to cooperate with a corresponding thread of the inner body, one of the bodies being blocked in translation and able to be connected to adapted a rotational driver while the other two bodies, each intended to be connected to the at least one mobile cowling and the at least one panel to be driven, are free in translation and blocked in rotation.

6. The thrust reversing device according to claim 5, wherein the body connected to the rotational driver is the central body, the inner body is intended to be connected to the at least one mobile cowling while the outer body is intended to be connected to the driving connection rod for pivoting the at least one panel.

7. The thrust reversing device according to claim 5, wherein the outer thread of the central body has a pitch larger than a pitch of the inner thread.

8. The thrust reversing device according to claim 1, wherein the actuating means comprise two distinct linear actuators respectively associated with the at least one mobile cowling and the at least one panel to be driven, each of the actuators comprising a shaft able to allow, respectively, the at least one panel to pivot toward a position where the at least one panel obstructs a cold flow jet and toward a position varying a section of the nozzle as well as translational movement of the at least one mobile cowling.

9. The thrust reversing device according to claim 1, wherein the at least one panel is mounted rotationally mobile around a pivot along an axis perpendicular to a longitudinal axis of the nacelle.

10. The thrust reversing device according to claim 1, further comprising an upstream seal between the cold flow jet and an outside of the nacelle.

11. The thrust reversing device according to claim 1, further comprising a downstream seal between an inner structure of the at least one mobile cowling and the at least one panel.

12. The thrust reversing device according to claim 1, wherein the at least one panel is extended by a fixed downstream shroud.

13. A dual-flow turbojet engine nacelle comprising a downstream section equipped with a thrust reversing device according to claim 1.

* * * * *